United States Patent
Luo et al.

(10) Patent No.: US 8,442,525 B2
(45) Date of Patent: May 14, 2013

(54) MEASURING NEIGHBORING CELL LOADING IN WIRELESS COMMUNICATIONS

(75) Inventors: Tao Luo, San Diego, CA (US); Juan Montojo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 720 days.

(21) Appl. No.: 12/407,195

(22) Filed: Mar. 19, 2009

(65) Prior Publication Data

US 2009/0247166 A1 Oct. 1, 2009

Related U.S. Application Data

(60) Provisional application No. 61/040,368, filed on Mar. 28, 2008.

(51) Int. Cl.
*H04W 4/00* (2009.01)
(52) U.S. Cl.
USPC .......................................... 455/434; 370/348
(58) Field of Classification Search ........................ None
See application file for complete search history.

(56) References Cited

U.S. PATENT DOCUMENTS

| | | | |
|---|---|---|---|
| 6,052,594 A * | 4/2000 | Chuang et al. ................. | 455/450 |
| 6,112,080 A | 8/2000 | Anderson et al. | |
| 7,756,101 B2 * | 7/2010 | Tervonen et al. ............ | 370/348 |
| 2006/0141956 A1 | 6/2006 | Mikami et al. | |
| 2007/0218917 A1 | 9/2007 | Frederiksen et al. | |
| 2007/0249386 A1 | 10/2007 | Bennett | |
| 2008/0037409 A1 | 2/2008 | Ogawa et al. | |
| 2010/0067445 A1 * | 3/2010 | Rinne et al. ................... | 370/329 |

FOREIGN PATENT DOCUMENTS

| | | |
|---|---|---|
| EP | 1906570 A1 | 4/2008 |
| JP | 2007019968 A | 1/2007 |
| JP | 2007300384 A | 11/2007 |
| WO | WO2007020996 A1 | 2/2007 |
| WO | WO2008010676 A1 | 1/2008 |

OTHER PUBLICATIONS

International Search Report and Written Opinion—PCT/US2009/038648, International Search Authority—European Patent Office—Dec. 11, 2009.

* cited by examiner

*Primary Examiner* — Chi Pham
*Assistant Examiner* — Kouroush Mohebbi
(74) *Attorney, Agent, or Firm* — Peter A. Clevenger

(57) ABSTRACT

Systems and methodologies are described that facilitate detecting cell interference and/or loading by analyzing control data transmitted between devices communicating in the cell. Control data resources can be transmitted related to communication received over data channels, and the control data resources can comprise quality indicators related to the data as well as resource identifiers that specify a resource over the data channel related to the data. Multiple control data resources can be transmitted per communication specifying a beginning and ending resource identifier of related data channel resources. If this control data is decodable at a wireless device, the associated resources corresponding to the resource identifiers can be marked as interfered and/or avoided in subsequent communication or resource allocation requests by the wireless device.

22 Claims, 11 Drawing Sheets

MEASURING NEIGHBORING CELL LOADING IN WIRELESS COMMUNICATIONS

CROSS-REFERENCE TO RELATED APPLICATIONS

This application claims the benefit of U.S. Provisional Patent application Ser. No. 61/040,368 entitled "MEASURING NEIGHBORING CELL LOADING USING PHICH" which was filed Mar. 28, 2008. The entirety of the aforementioned application is herein incorporated by reference.

BACKGROUND

I. Field

The following description relates generally to wireless communications, and more particularly to determining neighboring cell loading.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. The antennas can relate to both base stations and mobile devices, in one example, allowing bi-directional communication between the devices on the wireless network. Moreover, there can be multiple base stations in proximity such that communicating with one base station can cause interference at another base station over a portion of bandwidth. Also, mobile devices in proximity can interfere with one another when communicating with separate base stations using given portions of bandwidth.

In addition, the base stations and mobile devices can communicate control information, which can relate to whether communications are successfully received, in one example. Thus, the base stations and mobile devices can reserve portions of bandwidth for communicating packet receive acknowledgements (ACK) or non-acknowledgements (NAK); in one example, this can be communicated over a physical hybrid automatic repeat/request (HARQ) indicator channel (PHICH).

SUMMARY

The following presents a simplified summary of one or more embodiments in-order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating measuring loading related to one or more cells over a portion of bandwidth. For example, access points can transmit control data related to communicating with one or more access terminals, and a measuring access terminal can attempt to decode the control data to determine portions of bandwidth over which the access points or one or more access terminals exhibit high interference with respect to the measuring access terminal. It is to be appreciated that if the measuring access terminal can decode the control data, then the portion of bandwidth to which the control data relates can exhibit high interference with respect to the measuring access terminal. In another example, a level of interference can be measured with respect to the decoding that, if over a threshold, can indicate high interference over the related resources. In one example, multiple control data codes can be transmitted related to a single communication to identify boundaries of the communication; the measuring access terminal can mark bandwidth between the boundaries as exhibiting high interference where the control data is decodable or beyond a threshold measured with respect to the decoding.

According to related aspects, a method for detecting neighboring cell interference in wireless communications is provided. The method can include receiving control data related to a communication between wireless devices over one or more resources. The method further includes decoding the control data to determine an identifier related to the one or more resources and storing an indication that the one or more resources are interfered for subsequent utilization in communicating with an access point.

Another aspect relates to a wireless communications apparatus. The wireless communications apparatus can include at least one processor configured to decode control data related to a received communication between a plurality of neighboring wireless devices. The processor is further configured to determine one or more resources indicated in the decoded control data and transmit over one or more disparate resources based on the one or more indicated resources. The wireless communications apparatus also comprises a memory coupled to the at least one processor.

Yet another aspect relates to a wireless communications apparatus that facilitates mitigating interference in a wireless network. The wireless communications apparatus can comprise means for decoding control data from a communication between a plurality of disparate wireless devices. The wireless communications apparatus can additionally include means for receiving a resource identifier indicated in the control data and means for storing an indication that one or more resources related to the resource identifier exhibit interference.

Still another aspect relates to a computer program product, which can have a computer-readable medium including code for causing at least one computer to receive control data related to a communication between wireless devices over one or more resources. The computer-readable medium can also comprise code for causing the at least one computer to decode the control data to determine an identifier related to the one or more resources. Moreover, the computer-readable medium can comprise code for causing the at least one computer to store an indication that the one or more resources are interfered in an interference bitmap.

Moreover, an additional aspect relates to an apparatus. The apparatus can include a control data decoder that retrieves a resource identifier from received control data related to a plurality of disparate apparatuses. The apparatus can further include an interference detector that stores an indication that one or more resources relating to the resource identifier are interfered.

According to a further aspect, a method that facilitates indicating control data related to communication in a wireless network is provided. The method includes receiving a communication over one or more resources allocated to a wireless device and generating a first control data resource related to the communication including an identifier related to a beginning resource of the communication. The method also includes generating a second control data resource related to the communication including an identifier related to an ending resource of the communication.

Another aspect relates to a wireless communications apparatus. The wireless communications apparatus can include at least one processor configured to receive a communication over a plurality of resources allocated to a wireless device and generate a first control data resource related to the communication that indicates a beginning resource block of the communication and a second control data resource related to the communication that indicates an ending resource block of the communication. The processor is further configured to transmit the first and second control data resources over a wireless network. The wireless communications apparatus also comprises a memory coupled to the at least one processor.

Yet another aspect relates to a wireless communications apparatus for indicating communication resource information in control data. The wireless communications apparatus can comprise means for receiving data transmitted over a plurality of communication resources allocated to a wireless device by the wireless communications apparatus and means for initializing a first control data resource comprising an index related to a beginning resource block of the received data. The wireless communications apparatus can additionally include means for initializing a second control data resource comprising an index related to an ending resource block of the received data.

Still another aspect relates to a computer program product, which can have a computer-readable medium including code for causing at least one computer to receive a communication over one or more resources allocated to a wireless device. The computer-readable medium can also comprise code for causing the at least one computer to generate a first control data resource related to the communication including an identifier related to a beginning resource of the communication. Moreover, the computer-readable medium can comprise code for causing the at least one computer to generate a second control data resource related to the communication including an identifier related to an ending resource of the communication.

Moreover, an additional aspect relates to an apparatus. The apparatus can include a control data generator that initializes a first control data resource based at least in part on quality of a received communication from a wireless device and initializes a second control data resource based on the received communication that indicates an ending resource block identifier of the received communication. The apparatus can further include a transmitter that transmits the first and second control data resources over a wireless network.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
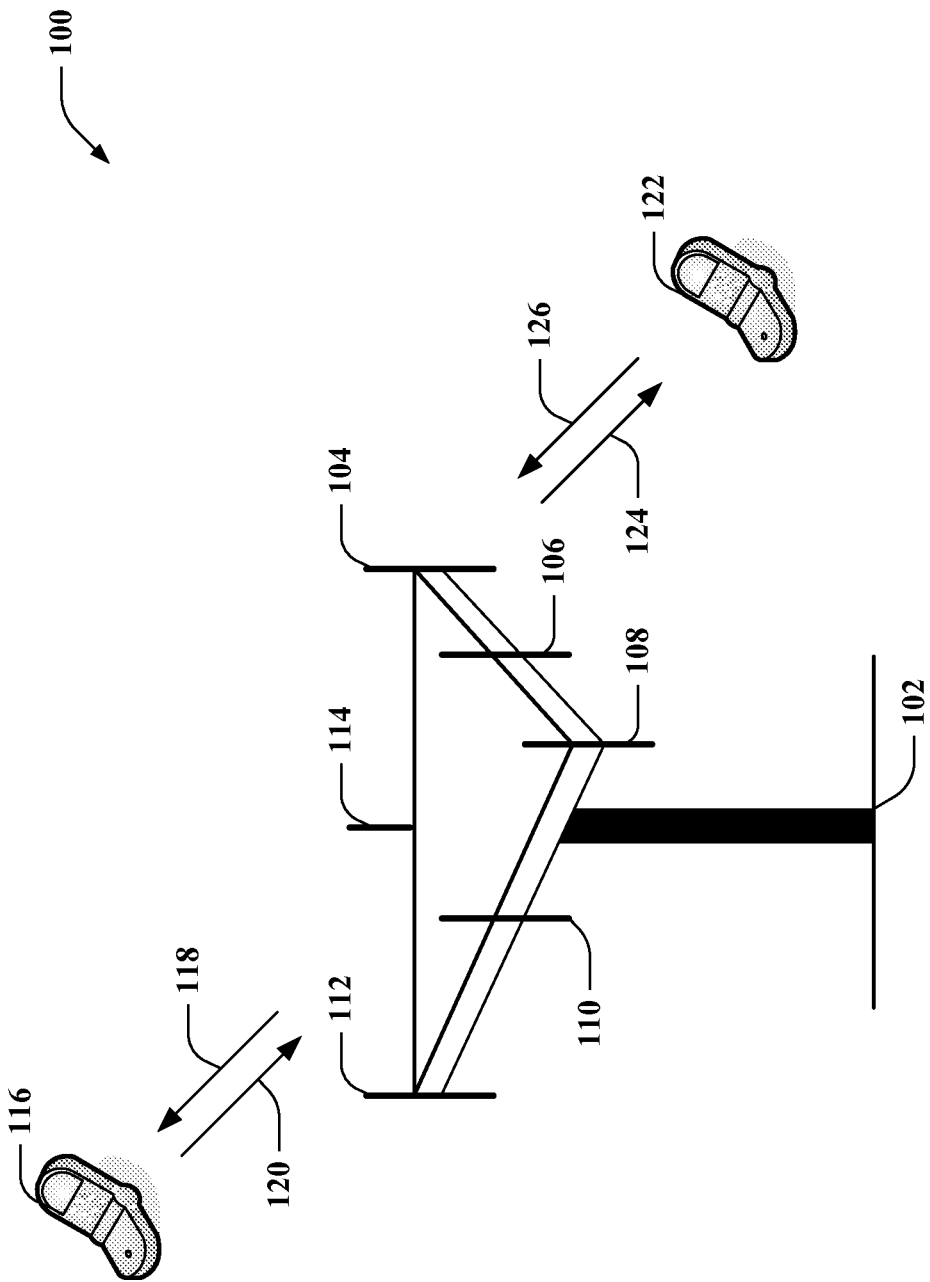
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in-order to provide a thorough understanding of one or more embodiments. It may be evident, however, that such embodiment(s) can be practiced without these specific details. In other instances, well-known structures and devices are shown in block diagram form in-order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). The techniques described herein can also be utilized in evolution data optimized (EV-DO) standards, such as 1xEV-DO revision B or other revisions, and/or the like. Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology (not shown).

According to an example, system 100 can be a multiple-input multiple-output (MIMO) communication system. Further, system 100 can utilize substantially any type of duplexing technique to divide communication channels (e.g., forward link, reverse link, . . . ) such as FDD, FDM, TDD, TDM, CDM, and the like. In addition, communication channels can be orthogonalized to allow simultaneous communication with multiple devices over the channels; in one example, OFDM can be utilized in this regard. In addition, the base station 102 and mobile devices 116 and 122 can transmit control data to one another related to quality of communication over one or more communication channels (or other portions of bandwidth, for example). For example, the control data can relate to whether data over a communication channel is successfully received. In this regard, the control data can be an acknowledgement (ACK) or non-acknowledgement (NAK) regarding successful receipt of certain data, for instance. One specific example of a control channel is a physical hybrid automatic repeat/request (HARQ) indicator channel (PHICH) over which ACKs and NAKs can be transmitted to indicate whether data received over one or more shared data channels is successfully received.

The control data can additionally indicate a resource block (e.g., a portion of frequency over time) within a communication channel to which it relates. In one example, the resource blocks of the communication channel can be indexed consecutively or otherwise. In addition, the channel can be divided into time periods, or frames, over which the base station 102 and mobile devices 116 and 122 can communicate. For example, the base station 102 can allocate one or more resources blocks in a given frame to each mobile device 116 and 122, which can be utilized to communicate with the base station 102 in each frame. In another example, clustering can be used for assigning resource blocks of a communication channel to one or more devices such that a communication channel is defined by clusters of frequency over time (such as clusters of tones in a set of OFDM symbols) which can be non-contiguous. In this example, the control data can indicate over which resource blocks of which clusters the related data was transmitted.

In one example, the mobile device 116 can receive control data transmitted by the base station 102 intended for disparate mobile devices, such as mobile device 122, to determine loading on the base station 102 and/or related cells. If the mobile device 116 can decode the control data, it can determine a related resource block over which data is transmitted from the mobile device 122 to the base station 102. In addition, if the mobile device 116 can decode the control data, this can indicate high interference over the resource block. In one example, the mobile device 116 can estimate the interference level based at least in part on accuracy of the decoding. Moreover, the base station 102 can transmit an additional control data resource specifying a last resource block in a related communication by the mobile device 122. The mobile device 116 can receive and attempt to decode this control data as well. If decoding is successful for this resource as well, the mobile device 116 can determine a span of resource blocks related to communication between the mobile device 122 and base station 102 that exhibits high interference to the mobile device 116.

Using this information, in an example, the mobile device 116 can avoid transmitting to the base station 102 and/or other base stations or devices during the determined resource blocks. According to another example, the mobile device 116 can control transmit power based at least in part on the determined resource blocks; for example, the mobile device 116 can transmit with lower power over the resource blocks successfully decoded from control data so as not to interfere with mobile device 122 communication. In yet another example, the mobile device 116 can also inform the a disparate base station (not shown) of the resource blocks in requesting resource allocation, and the disparate base station can allocate communication resources to the mobile device 116 to minimize interference with the base station 102 and mobile device 122 communication.

Figure 2:
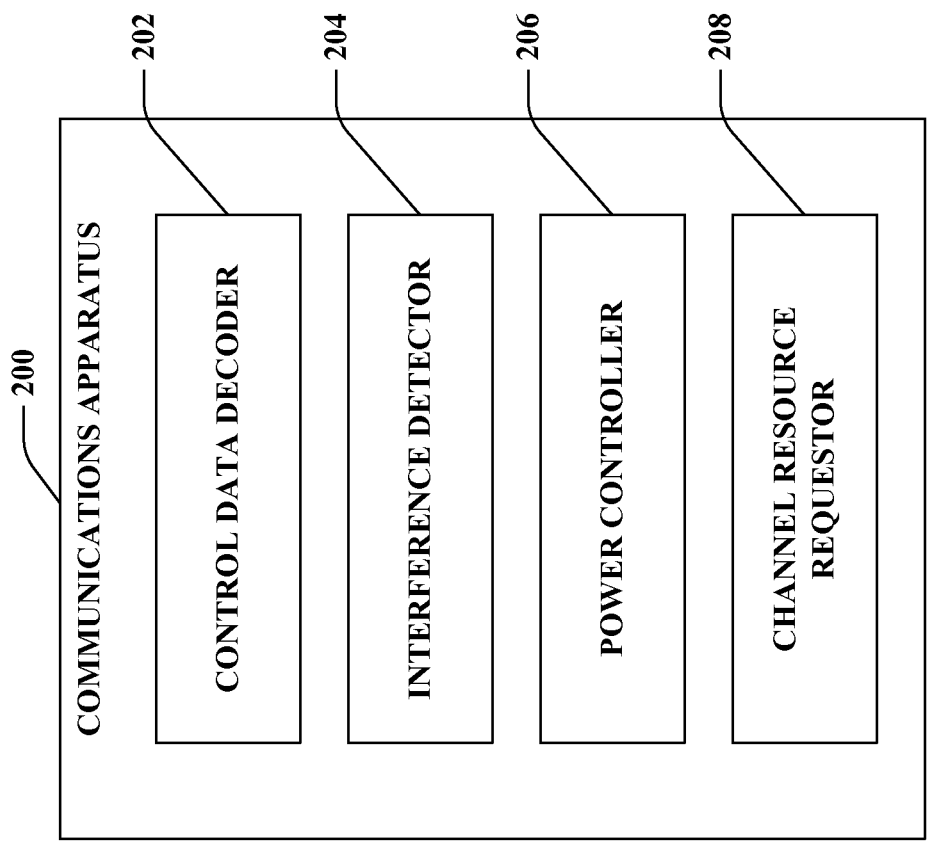
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. The communications apparatus 200 can include a control data decoder 202 that receives and interprets control data transmitted by one or more disparate devices (not shown), an interference detector 204 that can determine interference related to one or more disparate devices based on received control data, a power controller 206 that can adjust transmission power of the communications apparatus 200 based at least in part on determined interference, and a channel resource requester 208 that can transmit a request for communication channel resources to one or more access points in a wireless network.

According to an example, the control data decoder 202 can detect control data transmitted by an access point, which can be another communications apparatus, mobile device, base station, femtocell, and/or the like, to one or more disparate communications apparatuses (not shown). As described, the control data can relate to quality of data received by the access point over one or more communication channel resources and can be an ACK, NAK, and/or the like. The control data decoder 202 can attempt to decode the control data. If the control data decoder 202 can successfully decode the control data, then the communication channel resources related to the control data exhibit some level of interference with respect to the communications apparatus 200 since the signal was strong enough to decode. In addition, by decoding the control data, the control data decoder 202 can determine information regarding the communication channel resources utilized; in this regard, the control data can specify the communication resource(s) to which it relates. In one example, as described, this can be specified as a resource block index where a resource block can relate to a portion of frequency over time within a frame, which is a larger portion of frequency over time related to a communication channel. As described, disparate communications apparatuses can be assigned the same or similar resource block indices in each frame for a given channel.

Using such information, the interference detector 204 can determine one or more resources that exhibit high interference from other devices with respect to the communications apparatus 200. For example, where the control data indicates a communication channel resource to which it relates, the interference detector 204 can determine that the resource and/or contiguous resources on the communication channel are subject to high interference, and the communications apparatus 200 should avoid transmitting or receiving data over the resources. In one example, the control data indicators can also specify a category to which they relate. The categories, for example, can correspond to whether the control data indicator is for a start or end point of the related communication channel resources.

Thus, for example, the control data decoder 202 can receive and attempt to decode consecutive control data indicators (e.g., ACK, NAK, and/or the like) over a channel where each indicator as decoded specifies a resource to which it relates and a category. In this regard, a first control data indicator received by the control data decoder 202 can specify the related resource block index and that it is the starting block for communication over the channel. Furthermore, a second consecutive control data indicator received by the control data decoder 202 can specify the last resource block index for the related communication and that it is indeed the last block. In this regard, the interference detector 204 can evaluate the contiguous control data indicators, determine that they represent the first and last block of a communication over the channel, and discern the resource blocks to which they relate. From this information, the interference detector 204 can assume resource blocks between the first and last resource block are highly interfered with respect to the communications apparatus 200 since the control data decoder 202 was able to decode the indicators. It is to be appreciated that such categorized control data indicators can be transmitted where the interfering communication exceeds a threshold number of contiguous resource blocks, in one example.

As described, the interference detector 204 can also determine a relative level of interference over the communication resources based on signal quality, ease of decoding related control data by the control data decoder 202, and/or the like. The interference detector 204 can mark the resources as interfered or not based on the level, in one example. In another example, using this information, the power controller 206 can increase and/or decrease transmit power over the resources. For example, for resources where related data is successfully decoded by the control data decoder 202, the power controller 206 can decrease transmit power over the resources so as not to interfere with the disparate communication apparatus over the resources. The decrease in power, for example, can be related to a level of decoding success, interference, etc. when decoding the related control data. In addition, the channel resource requestor 208 can request communication channel resources from an access point based on the determined interference. In one example, the channel resource requester 208 can explicitly request resources that are not interfered as detected by the interference detector 204. In another example, the channel resource requestor 208 can transmit the interference information to the access point allowing the access point to schedule resources in view of the interfered resources.

Figure 3:
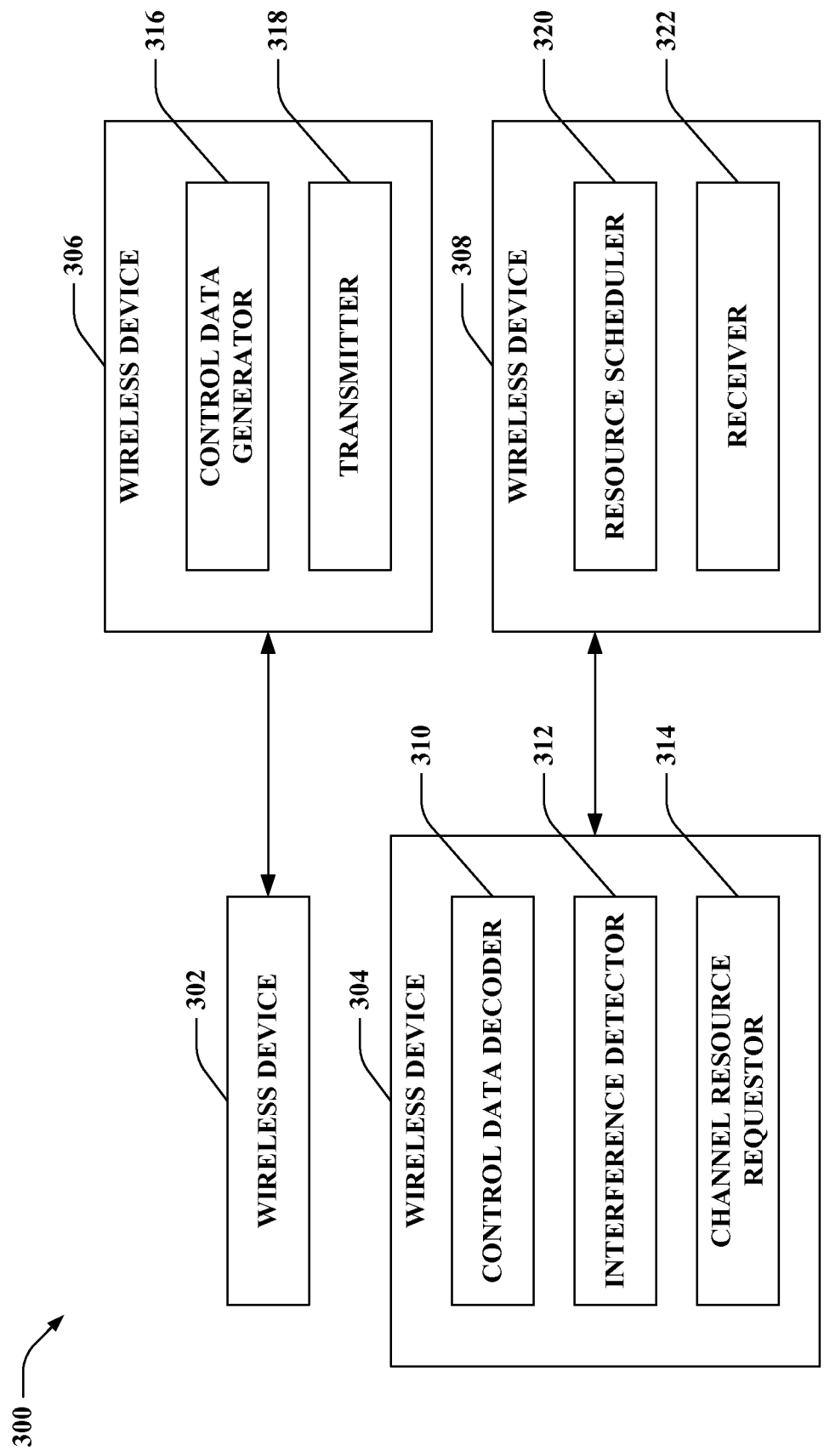
FIG. 3 is an illustration of an example wireless communications system that effectuates detecting cell loading utilizing control data transmitted in a cell.

Now referring to FIG. 3, illustrated is a wireless communications system 300 that facilitates utilizing control data to measure interference from neighboring cells. Wireless device 302, 304, 306, and/or 308 can be a mobile device (including not only independently powered devices, but also modems, for example), a base station, and/or portion thereof. In one example, the wireless devices 302, 304, 306, and/or 308 can communicate using peer-to-peer or ad hoc technology where the devices are of similar type. Moreover, system 300 can be a MIMO system and/or can conform to one or more wireless network system specifications (e.g., EV-DO, 3GPP, 3GPP2, 3GPP LTE, WiMAX, etc.). Also, the components and functionalities shown and described below in the wireless devices 304, 306 and/or 308 can be present in each wireless device 302, 304, 306, and/or 308 as well, in one example; the configuration depicted excludes these components for ease of explanation. In an example, the wireless device 302 can be communicating with the wireless device 306 in a different cell (which can be provided by the wireless device 306) than wireless device 304 communicating with wireless device 308.

Wireless device 304 includes a control data decoder 310 that determines control information transmitted by one or more devices, an interference detector 312 that evaluates the control information to determine one or more interfered communication channel resources and/or a level of interference related thereto, and a channel resource requestor 314 that transmits a request for resources according to the determined interference over the communication channel resources. The wireless device 306 can include a control data generator 316 that provides control data related to communications received over the resources and a transmitter 318 that transmits the control data to one or more devices. The wireless device 308 comprises a resource scheduler 320 that allocates channel resources to one or more devices for communicating thereover and a receiver 322 that receives channel communications over the resources.

According to an example, the wireless device 302 can communicate with the wireless device 306 over one or more provided communication channel resources. Control data generator 316 can, for example, determine a quality of communication received over the communication channel resources and provide control data to be conveyed to the wireless device 302. For example, the control data can be an ACK or NAK relating to successful receipt of the data over the communication channel resources. In this regard, the control data can also include an indication of the communication channel resource(s) to which it relates. For example, this can be a resource block identifier, as described, corresponding to the first resource block in the communication channel resource blocks utilized by the wireless device 302. Transmitter 318 can transmit the control data over the wireless network for receipt by the wireless device 302. In this regard, the wireless device 302 can determine whether the wireless device 306 successfully received data over a given resource block or set of blocks.

Wireless device 304 can additionally intercept the control data communication from transmitter 318. The control data decoder 310 can attempt to decode the control data communication. If successful, as described, this can indicate some level of interference over the communication channel resources related to the control data. In addition, where successfully decoded, the control data decoder 310 can determine information regarding the associated communication channel resources, such as a related resource block identifier. Using this information, the interference detector 312 can discern the related resource block identifier and consider the resource block identifier, and/or surrounding identifiers, interfered. In one example, interference detector 312 can store this information in an interference bitmap representing a number of resource block identifiers, which can each be marked interfered or non-interfered. In another example, the interference detector 312 can determine a level of interference based, for example, on ease of decoding the control data at the control data decoder 310, strength of the control data information signal, and/or the like. This information can be additionally or alternatively be indicated in the interference bitmap.

The channel resource requestor 314 can utilize this information in requesting resources from the wireless device 308 for subsequent communication thereover. For example, the channel resource requestor 314 can indicate desired resources in view of the detected interfered resources, indicate a minimum number of undesirable resources, transmit the interference bitmap to the wireless device 308, and/or the like. Transmitting the interference bitmap to the wireless device 308 can include, for example, indicating one or more beginning resource indices and related spans of interfered resources, reporting one or more resources having interference over a threshold level, encoding the bitmap, differentially encoding the bitmap, and/or the like. Resource scheduler 320 can utilize the information in allocating resources to the wireless device 304. Once allocated, the wireless device 304 can similarly transmit information over the communication channel resources, and the receiver 322 can receive the communications. It is to be appreciated that the wireless device 308 can also comprise a control data generator and transmitter (not shown) to similarly indicate control data related to receiving communication over the communication channel resources so that other wireless devices can similarly utilize the control data to detect cell interference.

In addition, for example, the control data generator 316 can provide multiple control data information related to a single channel resource communication. For instance, where the communication from the wireless device 302 spans a threshold number of resource blocks, the control data generator 316 can provide not only control data indicating the beginning resource block, but also separate control data indicating the end of the resource block. The control data generator 316 can include a category in the control data to indicate whether it represents the beginning or end of the communication; in one example, the category need only be utilized for control data representing the end of the communication to save bandwidth and/or processing. The control data decoder 310 can receive and attempt to decode the multiple control data.

In one example, as described, the control data decoder 310 can successfully decode control data, determine the related resource block, and/or a representative category. Where the category indicates the resource block identified corresponds to the end of the communication channel resources utilized, the interference detector 312 can combine the related resource block identifier to a previous resource block identifier to determine a span of communication channel resources exhibiting a level of interference. It is to be appreciated that the previous resource block identifier can be the last one received and decoded by the control data decoder 310 in a single carrier waveform configuration. The interference detector 312 can mark the span as interfered in the interference bitmap or otherwise use the information in subsequent communicating. In addition, for example, the interference detector 312 can indicate a related level of interference for the span, as described previously.

According to an example, the control data can relate to one or more PHICH resources transmitted by the transmitter 318. It is to be appreciated, though not shown, that more wireless devices in more cells can exist, and the control data decoder 310 can attempt to decode substantially all PHICH resources received. As described, where a PHICH resource is associated with a category indicating last resource block, the interference detector 312 can determine a span of interfered resources from the previously received PHICH resource. Where only one PHICH resource is received for a given communication, the interference detector 312 can mark only the related communication channel resource as interfered and/or a number of surrounding resources, for example.

In another example, the wireless devices 302, 304, 306, and 308 can communicate using clustering. In this example, channel resources can be divided into clusters of frequency and/or time in a frame instead of contiguous blocks in a frame, as described above. Thus, communication channel resources allocated to one or more wireless devices, such as wireless device 302, can span multiple clusters. In this regard, the control data generator 316 can provide control data related to communication received over the resources for each cluster and can define categories related to beginning and/or ending points in each cluster. Thus, the control data decoder 310 can similarly receive such control data and attempt decoding. Where decoding is successful, the interference detector 312 can determine categories related to the control data such that it can mark spans of resources within the given clusters as interfered or non-interfered, as described.

Figure 4:
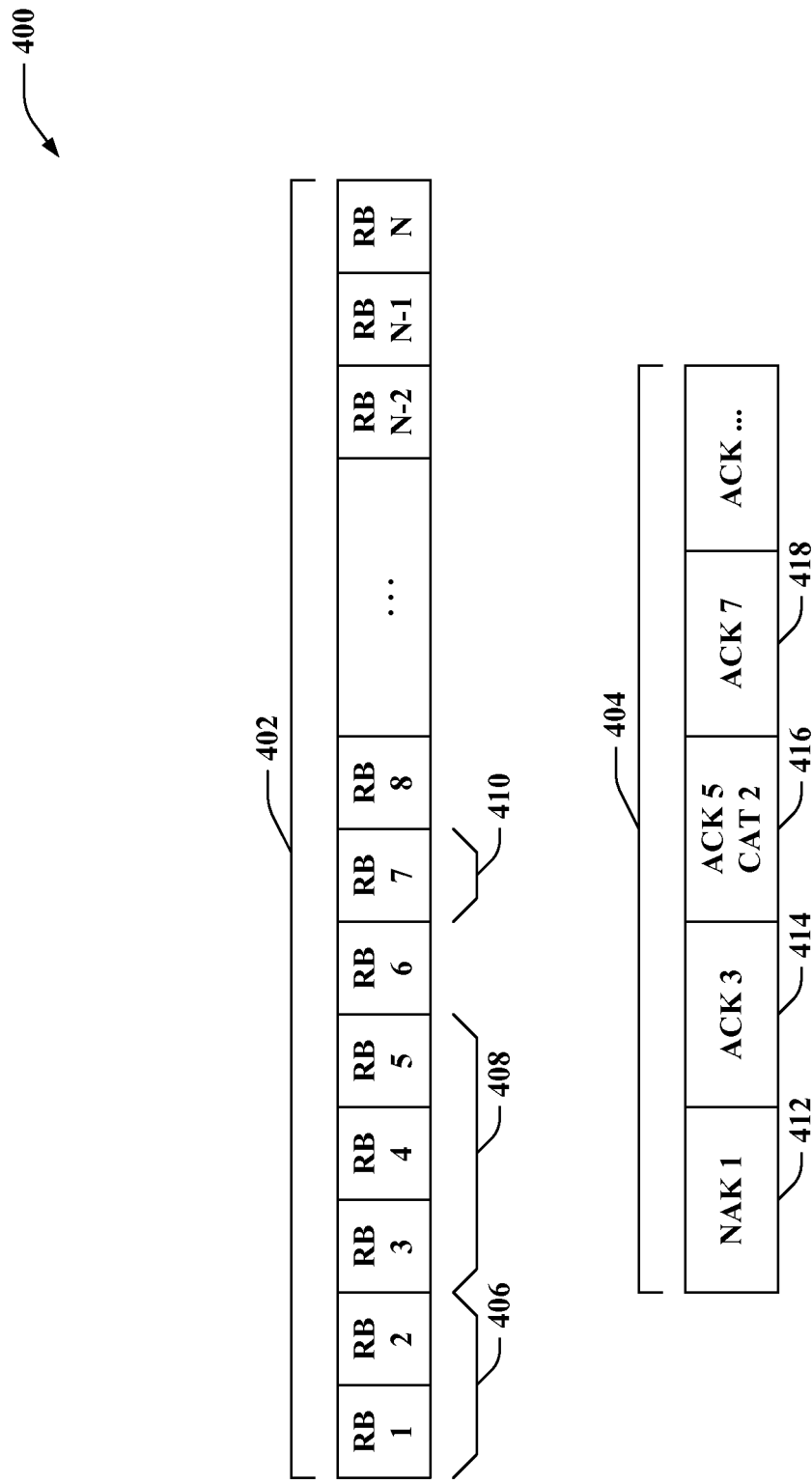
FIG. 4 is an illustration of example communication and control channel resources facilitating cell loading determination.

Turning now to FIG. 4, illustrated are sample transmission blocks 400 related to communication channel resources 402 and corresponding control data resources 404. As depicted, communication channel resources 402 can relate to a plurality of resource blocks (e.g., n resource blocks) in a given frame allocated to one or more devices for communicating data. In one example, the channel resources can relate to a shared uplink channel. For example, resource blocks 1 and 2 can be grouped into resource group 406 allocated to a device. Similarly, resource blocks 3-5 are grouped into resource group 408, and resource block 7 into resource group 410. The resource groups 406, 408, and/or 410 can be allocated to one or more devices for communicating data in a wireless network. Furthermore, the communication channel resources 402 can be allocated by an access point or other device in the wireless network.

The allocating device can receive data over the communication channel resources 402 and provide control data resources 404 to indicate information regarding receipt of the data over the communication channel resources 402. As described, the control data can relate to an ACK acknowledging successful receipt of the data, NAK indicating failed receipt of the data, and/or the like. The control data resources 404 depicted, which can be transmitted over a wireless network in response to receiving related data over the communication channel resources 402, are NAK 1 412, which indicates failed receipt of data over a group or single resource beginning at resource block 1, ACK 3 414, which indicates successful receipt of data over a group or single resource beginning at block 3, ACK 5 CAT 2 416, which indicates successful receipt of data over a group of resources ending at block 5 (e.g., group 408), ACK 7 418, which indicates successful receipt of data over a group or single resource beginning at block 7, and so on.

Thus, for example, a device evaluating cells for loading can receive the control data resources 404 and can determine related interference where the device is able to decode one or more of the control data resources 404. For instance, if the device can successfully decode the NAK 1 412, it can determine that resource block 1 is interfered (e.g., regardless of the actual control data value). Upon receiving ACK 3 414, if the device cannot decode the control data resource, it can determine that there are no other control data resources corresponding to the communication over resource block 1. Thus, only resource block 1, and/or a number of surrounding resource blocks, can be marked as interfered. For example, the device can assume where only one control data resource is received for a resource block that a number n of subsequent resources blocks are interfered; this can be, for example, a known minimum number of allocable blocks per device. If the device can decode the ACK 3 control data resource 414, it can determine that the control data resource relates to a new communication beginning at resource block 3, since no category is specified. It is to be appreciated that a category can be specified indicating a related resource block as the beginning of the communication, in one example.

If the device can decode ACK 3 414, it can likely also decode the ACK 5 CAT 2 control data resource 416 since it relates to the same communication group 408. Since this is a category 2 resource, which indicates it relates to an ending resource block of a communication, the device can match this to the ACK 3 414 control data resource, the last control data resource successfully decoded, and determine that resource blocks between and including blocks 3 through 5 (e.g., channel resource group 408) as interfered. It is to be appreciated, as mentioned, that more categories can be utilized, such as in the case of multiple clusters where a category can be used to indicate beginning and ending of a communication in each cluster. In this regard, a device can determine interfered resources that span clusters. As described, the interference information can be stored in an interference bitmap as Boolean indicators, a level of interference determined from decoding the control data, and/or the like.

Figure 5:
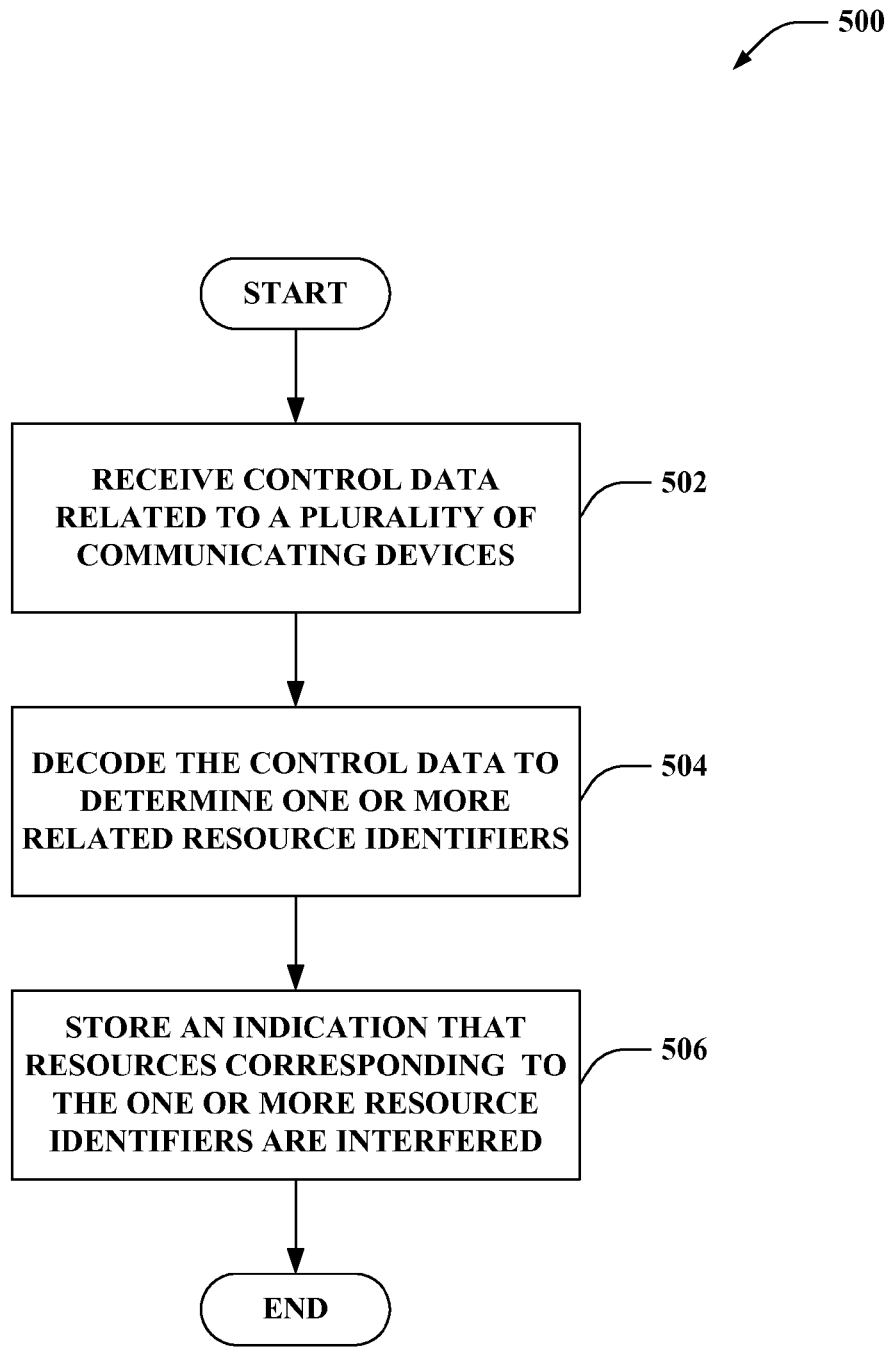
FIG. 5 is an illustration of an example methodology that facilitates determining cell interference based on decoded control data.
Figure 6:
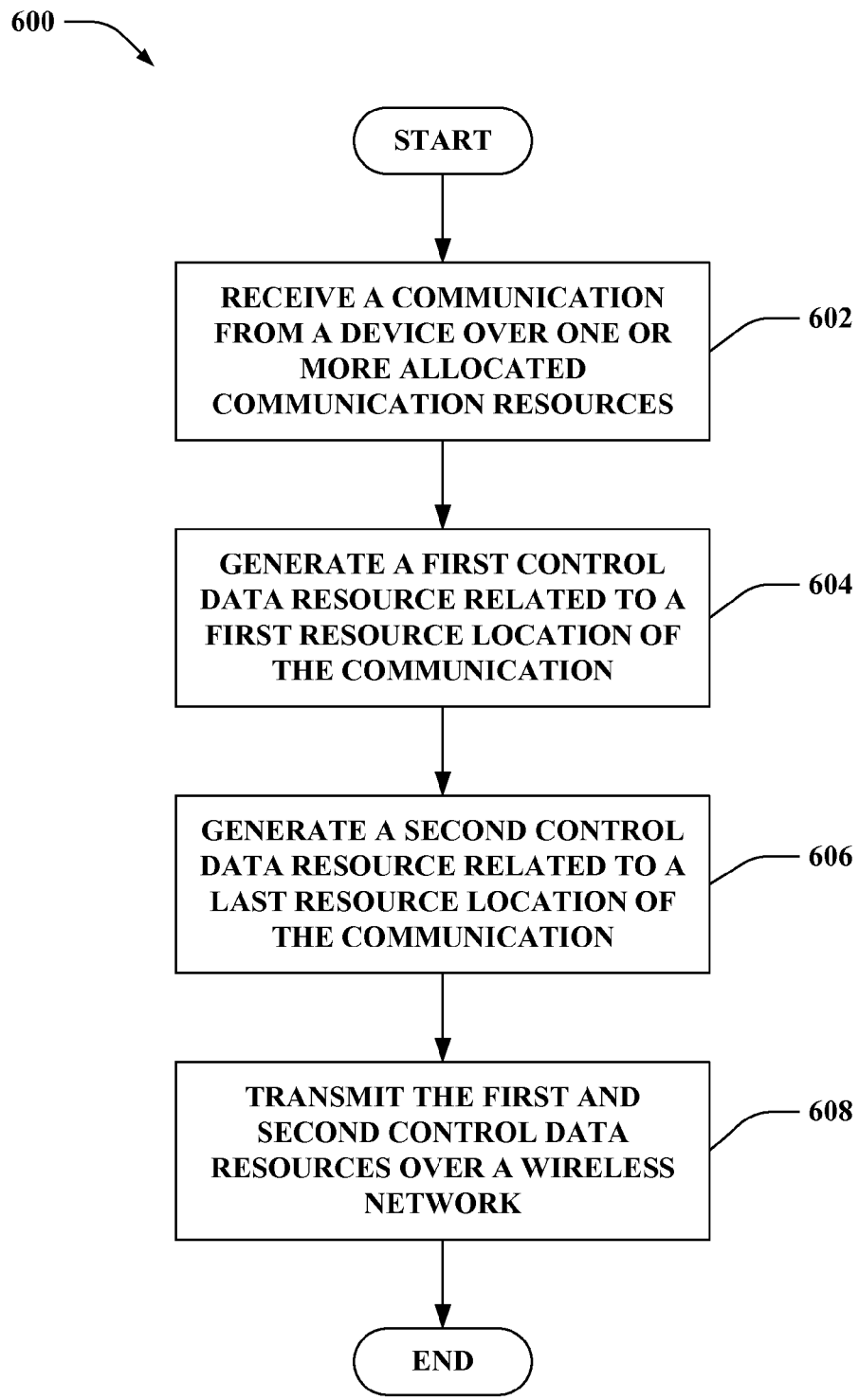
FIG. 6 is an illustration of an example methodology that facilitates transmitting multiple control data resources for a given communication.

Referring to FIGS. 5-6, methodologies relating to detecting cell loading and resource interference based on received control data are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, a methodology 500 that facilitates determining cell interference and/or loading based on received control data is illustrated. At 502, control data related to a plurality of communicating devices can be received. For example, the control data can relate to quality of communications over a set of resources allocated to a transmitting device by a receiving device. The control data can additionally specify a resource identifier to which it relates as well as a category indicating whether the resource identifier relates to a beginning or ending resource of the communication (e.g., and/or beginning/ending of a cluster for resources of the communication), as described. At 504, the control data can be decoded to determine one or more related resource identifiers. Thus, as described, resources to which the control data relates can be determined.

Where the control data can be decoded, as described, this can indicate interference for the related resource identified by the resource identifier, and at 506, an indication that resources corresponding to the one or more resource identifiers are interfered can be stored. Thus, the interference information can be subsequently utilized in transmitting data over the wireless network, requesting resources from an access point, and/or the like. In another example, a level of interference can be determined when decoding the control data, and the interference determination at 504 can be based on whether the level exceeds a threshold level. Moreover, the control data can comprise multiple control data resources relating to the same communication, as described, where each resource can indicate a category related to whether the control data resource relates to a beginning or ending of the communication within a set of contiguous resources or over clusters of resources, for example.

Turning to FIG. 6, illustrated is a methodology 600 that facilitates providing multiple control data resources indicating resource locations related to a communication. At 602, a communication can be received from a device over one or more allocated communication resources. The communication can be received, for example, over allocated communication channel resources. At 604, a first control data resource related to a first resource location of the communication can be generated. The control data resource can indicate not only a quality of the communication received, but also the beginning resource location over which the communication is received. At 606, a second control data resource related to a last resource location of the communication can be generated. The second control data resource can indicate the quality of the communication as well and the ending resource location related to the allocated resources. At 608, the first and second control data resources can be transmitted over a wireless network. Thus, for example, upon receiving the first and second control data resources, a span of related resources can be determined for marking the resources as interfered, as described supra.

It will be appreciated that, in accordance with one or more aspects described herein, inferences can be made regarding determining a level of interference related to communication channels from received control data resources, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 7:
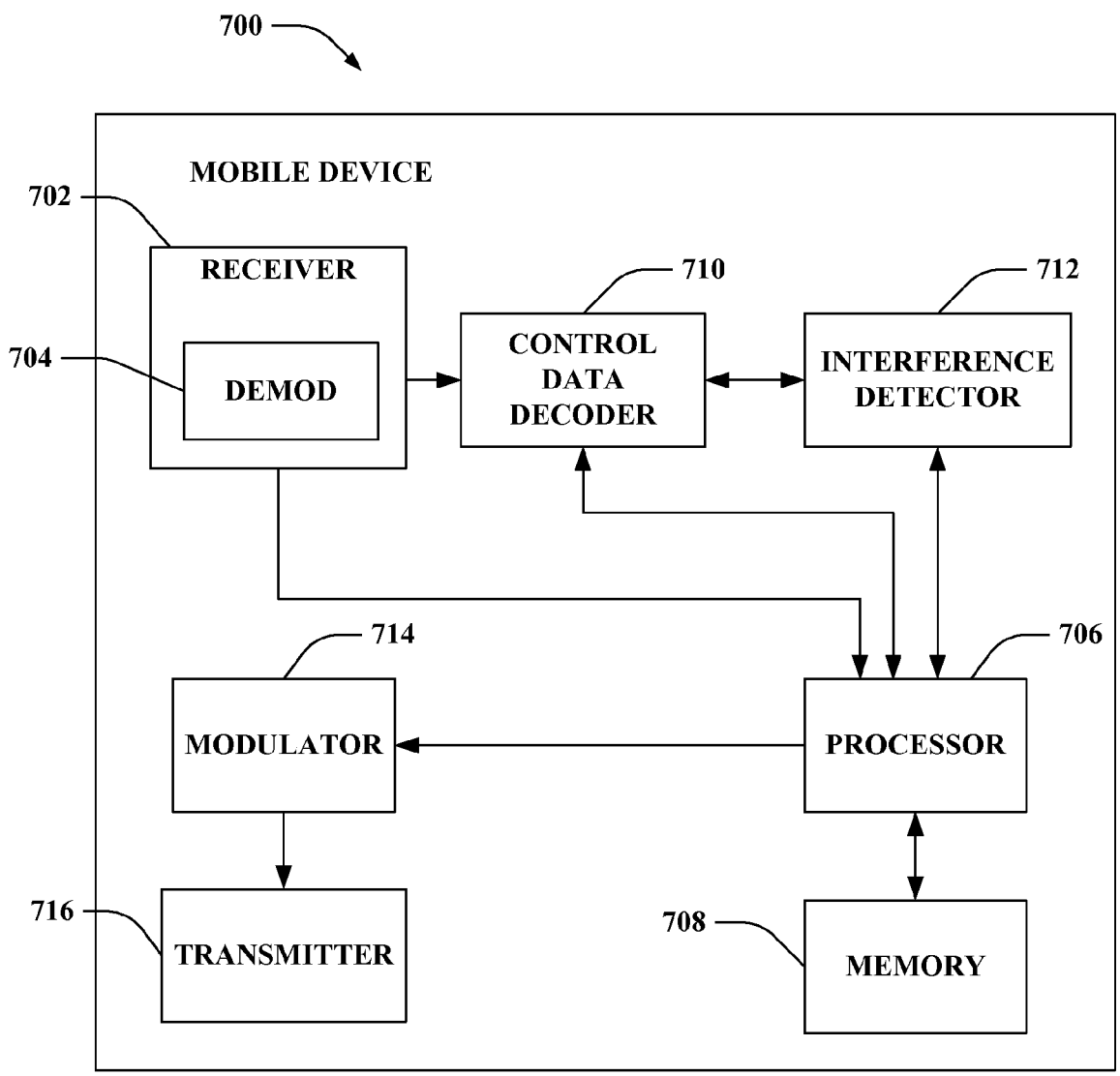
FIG. 7 is an illustration of an example mobile device that decodes control data to determine interference over one or more communication resources.

FIG. 7 is an illustration of a mobile device 700 that facilitates receiving control data and determining cell interference based on the control data. Mobile device 700 comprises a receiver 702 that receives one or more signals over one or more carriers from, for instance, a receive antenna (not shown), performs typical actions on (e.g., filters, amplifies, downconverts, etc.) the received signals, and digitizes the conditioned signals to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

The receiver 702 and/or processor 706 can further be operatively coupled to a control data decoder 710 that receives control data transmitted by a wireless device in a wireless network in response data received from another wireless device over a set of communication resources (such as a channel). As described, the control data can relate to the quality of communication over the resources and can indicate an identifier of the first and/or last of the resources. Thus, the control data decoder 710 can attempt to decode received control data, and if decodable, can determine related resource identifiers. In addition, multiple control data resources can be received relating to the same communication, where the resources can indicate a category corresponding to whether the resource relates to the first or last resource identifier of the communication (and/or first or last in one or more clusters spanned by the communication).

The processor 706 and/or control data detector 710 are further operatively coupled to an interference detector 712 that can store indications of interfered resources using related identifiers. Where control data is successfully decoded by the control data decoder 710, the interference detector 712 can indicate the related resource as interfered. As described, where the control data decoder 710 decodes multiple control data resources related to a single communication, the interference detector 712 can indicate a related span of resources as interfered. In addition, the interference detector 712 can indicate a level of interference where such is specified by the control data decoder 710 and/or the level of interference can indicate whether the resource is interfered at all (e.g., if the level meets a threshold). Also, the interference detector 712 can indicate interference of resources in an interference bitmap and/or the like, as described, which can be utilized by the processor 706 to avoid transmitting over interfered resources and/or in requesting resource allocation from an access point. The mobile device 700 also comprises a modulator 714 and transmitter 716 that modulate and transmit the signals to, for instance, a base station, another mobile device, etc. Although depicted as being separate from the processor 706, it is to be appreciated that the demodulator 704, control data decoder 710, interference detector 712, and/or modulator 714 can be part of the processor 706 or multiple processors (not shown).

Figure 8:
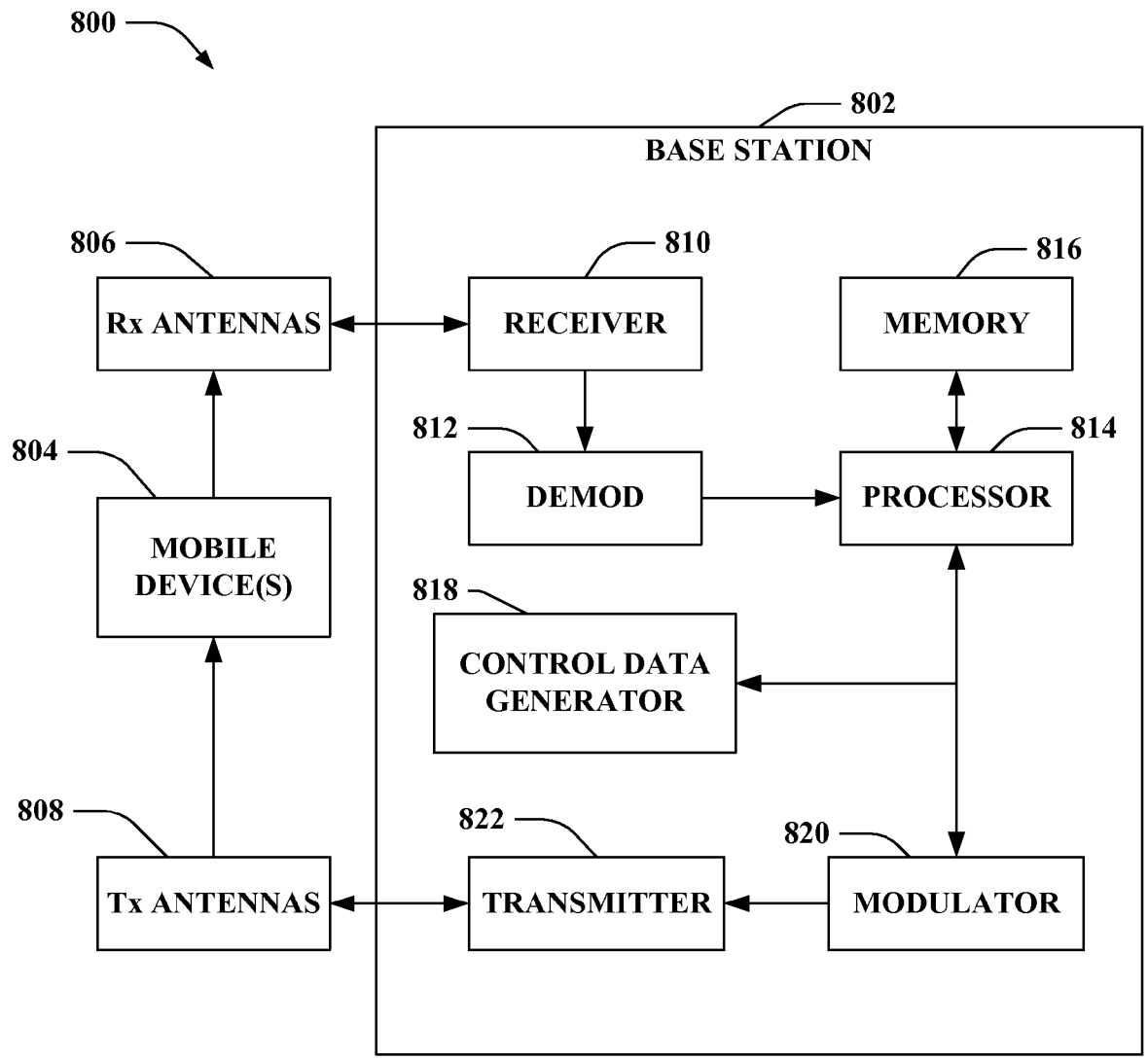
FIG. 8 is an illustration of an example system that generates multiple control data resources for a given communication.

FIG. 8 is an illustration of a system 800 that facilitates generating multiple control data resources related to a received communication. The system 800 comprises a base station 802 (e.g., access point, . . . ) with a receiver 810 that receives signal(s) from one or more mobile devices 804 through a plurality of receive antennas 806, and a transmitter 822 that transmits to the one or more mobile devices 804 through a transmit antenna 808. Receiver 810 can receive information from receive antennas 806 and can decode received signals. Furthermore, demodulator 812 can demodulate received signals. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a control data generator 818 that initializes control data related to a communication received over resources allocated to one or more mobile device(s) 804.

According to an example, the control data generator 818 can create control data resources (e.g., for transmission over a PHICH) related to received communication, and the control data resources can additionally indicate a resource identifier related to the communication. In one example, the control data resource can indicate a beginning resource identifier related to the communication. Additionally, the control data generator 818 can create a control data resource related to the ending resource identifier in the communication. In this case, the control data generator 818 can also indicate a category specifying that the control data resource relates to the ending identifier. In addition, as described, additional categories can be utilized where the control data generator 818 initializes control data related to the beginning and/or ending resource of a related cluster. The transmitter 822 can transmit the control data resources over the transmitting antennas 808, for example. Furthermore, although depicted as being separate from the processor 814, it is to be appreciated that the demodulator 812, control data generator 818, and/or modulator 820 can be part of the processor 814 or multiple processors (not shown).

Figure 9:
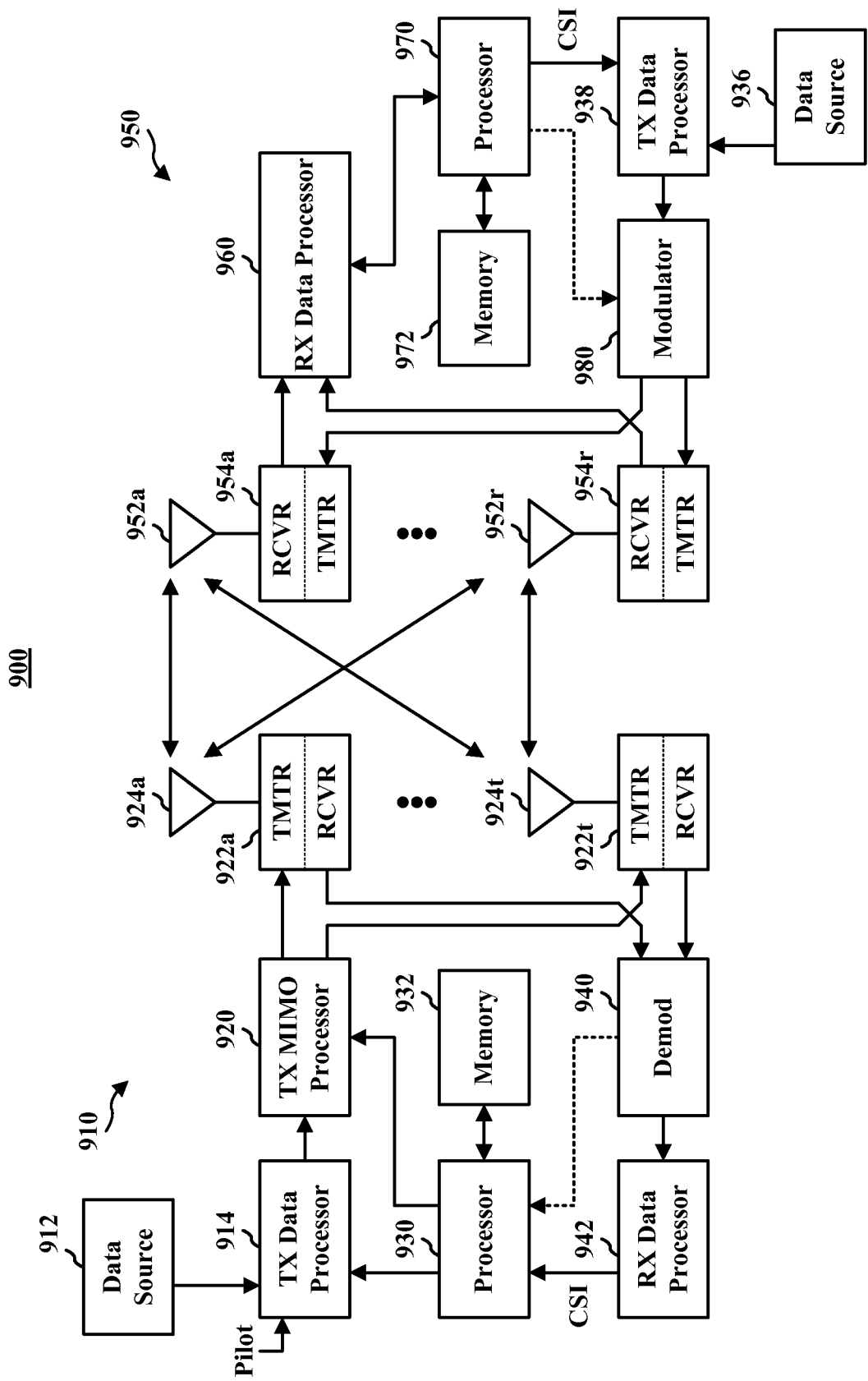
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3 and 7-8), transmission blocks (FIG. 4), and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., BPSK, QPSK, M-PSK, M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which precoding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
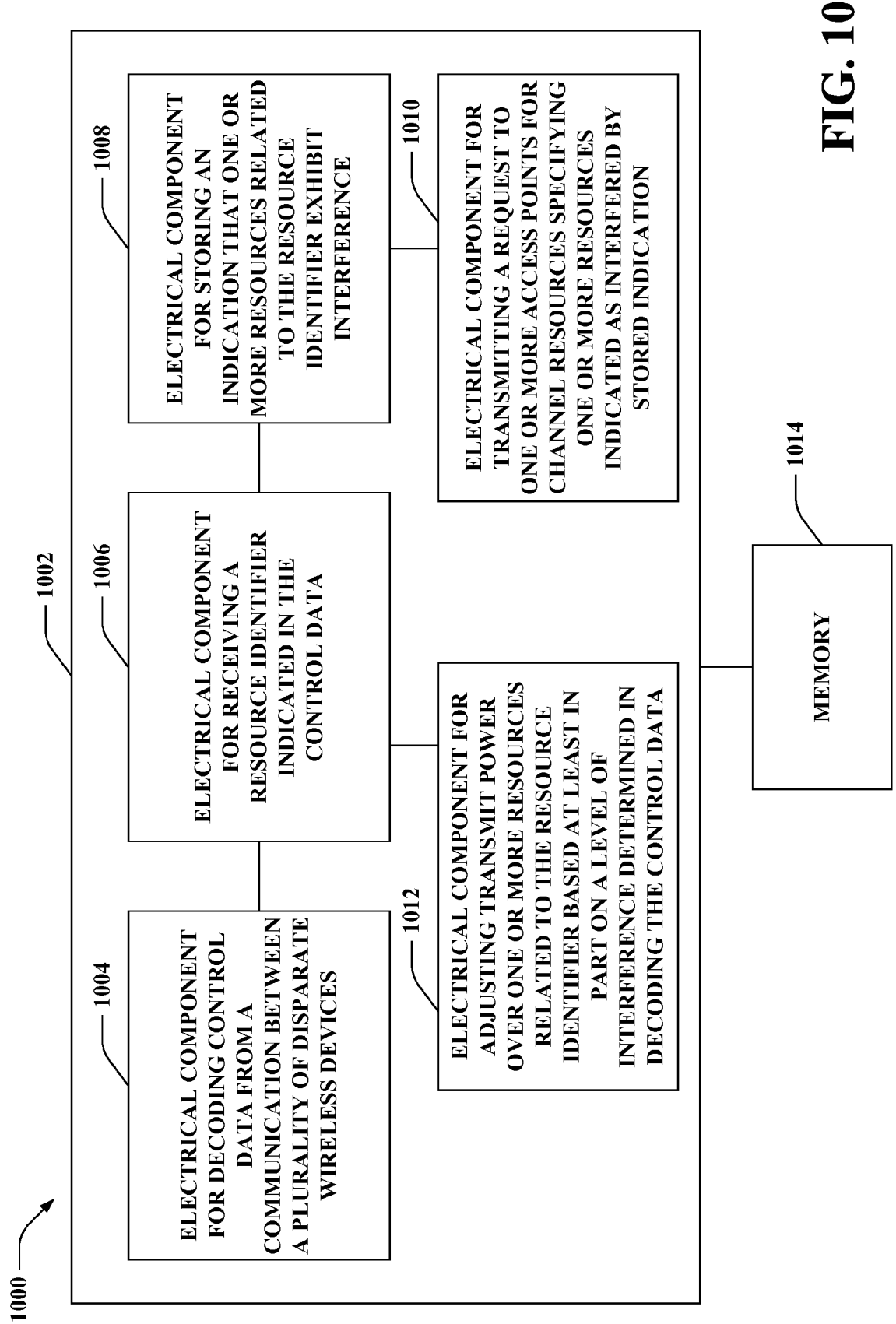
FIG. 10 is an illustration of an example system that determines cell interference based on received and decoded control data.

With reference to FIG. 10, illustrated is a system 1000 that decodes control data to determine cell loading and/or interference. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for decoding control data from a communication between a plurality of disparate wireless devices 1004. For example, the control data can relate to quality of communication transmitted from one device to another and can include a resource identifier related to a beginning and/or ending resource in the communication. Further, logical grouping 1002 can comprise an electrical component for receiving a resource identifier indicated in the control data 1006.

Furthermore, logical grouping 1002 can include an electrical component for storing an indication that one or more resources related to the resource identifier exhibit interference 1008. Thus, for example, based on receiving the identifier and being able to decode the data (e.g., and/or the determining a level of interference from the decoding as exceeding a threshold level), the related resource can be marked as interfered. Further, as mentioned, multiple resource identifiers can be received in multiple control data resources indicating a span of identifiers that can be marked as interfered. In addition, logical grouping 1002 can comprise an electrical component for transmitting a request to one or more access points for channel resources specifying one or more resources indicated as interfered by stored indication 1010. The one or more resources indicated as interfered can be specified in a request that such resources not be allocated to the system 1000. Also, logical grouping 1002 can comprise an electrical component for adjusting transmit power over one or more resources related to the resource identifier based at least in part on a level of interference determined in decoding the control data 1012. Additionally, system 1000 can include a memory 1014 that retains instructions for executing functions associated with electrical components 1004, 1006, 1008, 1010, and 1012. While shown as being external to memory 1014, it is to be understood that one or more of electrical components 1004, 1006, 1008, 1010, and 1012 can exist within memory 1014.

Figure 11:
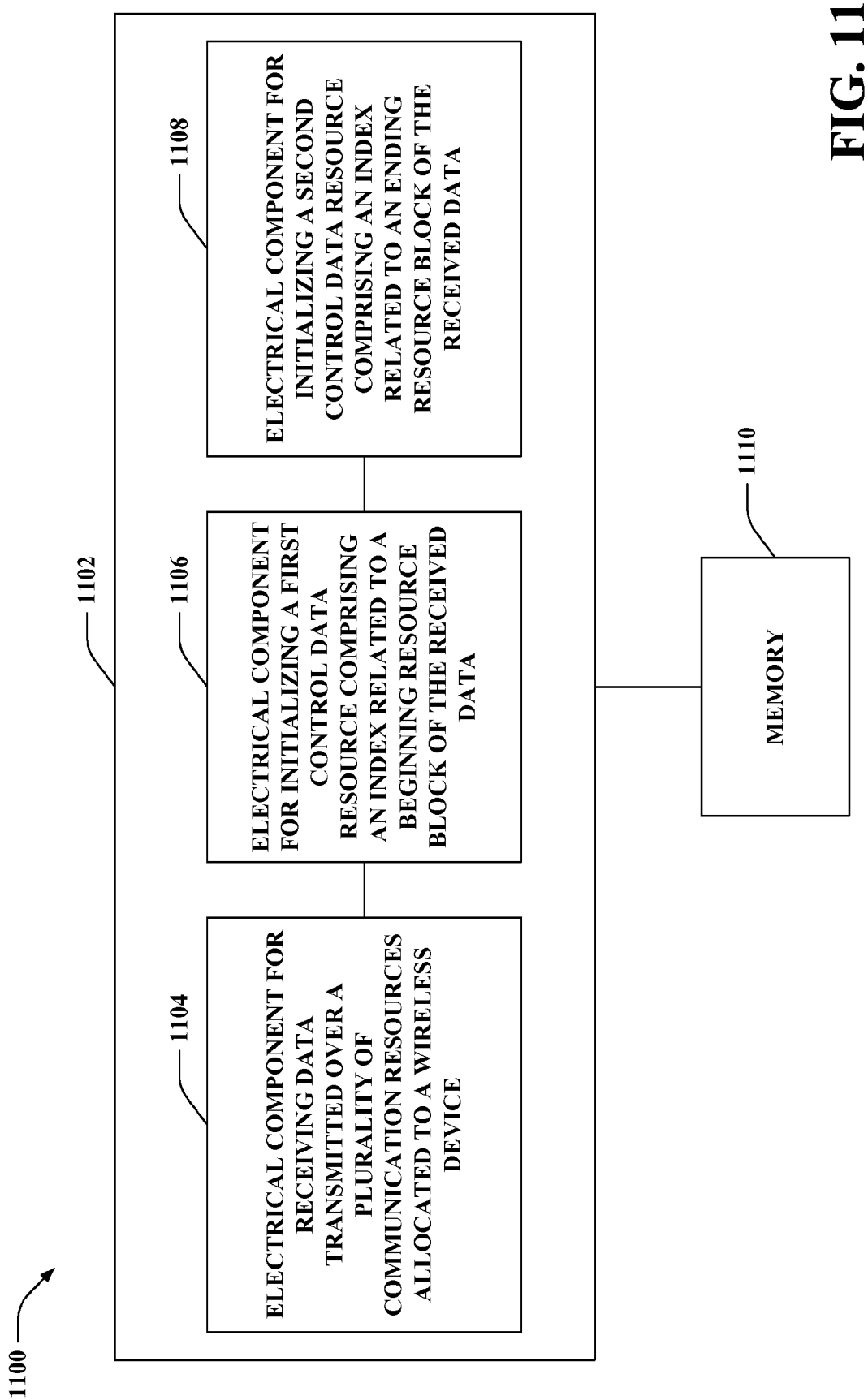
FIG. 11 is an illustration of an example system that generates multiple control data resources for a communication received over a wireless network.

Turning to FIG. 11, illustrated is a system 1100 that generates multiple control data resources related to a single communication received over allocated resources to facilitate determining cell interference. System 1100 can reside within a base station, mobile device, etc., for instance. As depicted, system 1100 includes functional blocks that can represent functions implemented by a processor, software, or combination thereof (e.g., firmware). System 1100 includes a logical grouping 1102 of electrical components that generate control data for received communications. Logical grouping 1102 can include an electrical component for receiving data transmitted over a plurality of communication resources allocated to a wireless device 1104. For example, the resources can be allocated to the wireless device by the system 1100 to facilitate communication therewith.

Moreover, logical grouping 1102 can include an electrical component for initializing a first control data resource comprising an index related to a beginning resource block of the received data 1106. Further, logical grouping 1102 can also include an electrical component for initializing a second control data resource comprising an index related to an ending resource block of the received data 1108. In this regard, the first and second control data resources can be transmitted not only to the device related to the communication but can also be received at one or more devices, as described, allowing identification of resource related to decodable control data. Additionally, system 1100 can include a memory 1110 that retains instructions for executing functions associated with electrical components 1104, 1106, and 1108. While shown as being external to memory 1110, it is to be understood that electrical components 1104, 1106, and 1108 can exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

What is claimed is:

1. A method for detecting neighboring cell interference in wireless communications, comprising:
   receiving control data related to a communication between wireless devices over one or more resources;
   decoding the control data to determine an identifier related to the one or more resources; and
   storing an indication that the one or more resources are interfered for subsequent utilization in communicating with an access point;
   wherein storing the indication that the one or more resources are interfered includes initializing a related value in an interference bitmap,
   wherein the interference bitmap identifies,
      a number of resource block identifiers as interfered or non-interfered,
      a signal strength, and
      a level of success in decoding the control data of a plurality neighboring devices.

2. The method of claim 1, further comprising transmitting over one or more disparate resources based at least in part on identifying the one or more resources as interfered from the stored indication.

3. The method of claim 1, wherein storing the indication that the one or more resources are interfered includes initializing the related value in the interference bitmap with a level of interference determined from decoding the control data.

4. The method of claim 1, further comprising transmitting the interference bitmap to the access point in requesting resources from the access point.

5. The method of claim 4, wherein transmitting the interference bitmap includes indicating one or more beginning resources and related spans of resources as interfered.

6. The method of claim 4, wherein transmitting the interference bitmap includes reporting one or more resources having interference over a specified threshold level.

7. The method of claim 4, wherein transmitting the interference bitmap includes encoding the bitmap.

8. The method of claim 7, wherein encoding the bitmap include differentially encoding the bitmap.

9. The method of claim 1, further comprising receiving disparate control data related to the communication and decoding the disparate control data to determine a disparate identifier related to the communication.

10. The method of claim 9, wherein the identifier relates to a beginning resource block related to the communication and the disparate identifier relates to an ending resource block related to the communication.

11. The method of claim 10, wherein storing the indication that the one or more resources are interfered includes initializing values related to a span of resources from the beginning resource block to the ending resource block.

12. The method of claim 1, further comprising adjusting transmit power for communicating over the one or more resources based at least in part on a level of interference related to decoding the control data.

13. A wireless communications apparatus, comprising:
   at least one processor configured to:
      decode control data related to a received communication between a plurality of neighboring wireless devices;
      determine one or more resources indicated in the decoded control data as resources experiencing interference;
      initialize an indication that the one or more resources experiencing interference in an interference bitmap,
      wherein the interference bitmap identifies,
         a number of resource block identifiers as interfered or non-interfered,
         a signal strength, and
         a level of success in decoding the control data of a plurality neighboring devices; and
      transmit over one or more disparate resources based on the one or more indicated resources; and
   a memory coupled to the at least one processor.

14. A wireless communications apparatus that facilitates mitigating interference in a wireless network, comprising:
   means for decoding control data from a communication between a plurality of disparate wireless devices;
   means for receiving a resource identifier indicated in the control data; and
   means for storing an indication that one or more resources related to the resource identifier exhibit interference,
   wherein storing the indication that the one or more resources are interfered includes initializing a related value in an interference bitmap,
   wherein the interference bitmap identifies,
      a number of resource block identifiers as interfered or non-interfered,
      a signal strength, and
      a level of success in decoding the control data of a plurality neighboring devices.

15. A computer program product, comprising:
   a non-transitory computer-readable medium comprising:
      code for causing at least one computer to receive control data related to a communication between wireless devices over one or more resources;
      code for causing the at least one computer to decode the control data to determine an identifier related to the one or more resources; and
      code for causing the at least one computer to store an indication that the one or more resources are interfered in an interference bitmap,
      wherein storing the indication that the one or more resources are interfered includes initializing a related value in an interference bitmap,
      wherein the interference bitmap identifies,
         a number of resource block identifiers as interfered or non-interfered,
         a signal strength, and
         a level of success in decoding the control data of a plurality neighboring devices.

16. An apparatus, comprising:
   a control data decoder that retrieves a resource identifier from received control data related to a plurality of disparate apparatuses; and
   an interference detector that stores an indication that one or more resources relating to the resource identifier are interfered,
   wherein storing the indication that the one or more resources relating to the resource identifier are interfered includes initializing a related value in an interference bitmap,
   wherein the interference bitmap identifies,
      a number of resource block identifiers as interfered or non-interfered,
      a signal strength, and a level of success in decoding the control data of a plurality neighboring devices.

17. The apparatus of claim 16, further comprising a channel resource requestor that transmits a request to one or more access points for channel resources specifying one or more resources indicated as interfered by the interference detector.

18. The apparatus of claim 17, wherein the channel resource requestor transmits the interference bitmap in the request for channel resources.

19. The apparatus of claim 16, wherein the indication stored in the interference bitmap by the interference detector is a level of interference determined by the control data decoder in decoding the received control data.

20. The apparatus of claim 16, wherein the control data decoder retrieves a disparate resource identifier from disparate received control data related to the plurality of disparate apparatuses.

21. The apparatus of claim 20, wherein the interference detector stores indications that resources related to the resource identifier, the disparate resource identifier, and resource identifiers between the resource identifier and the disparate resource identifier are interfered.

22. The apparatus of claim 21, further comprising a power controller that adjusts transmit power over one or more resources related to the resource identifier based at least in part on a level of interference determined by the control data decoder related to receiving the control data.

* * * * *